United States Patent [19]

Ishikawa et al.

[11] Patent Number: 5,424,707
[45] Date of Patent: Jun. 13, 1995

[54] NTC THERMISTOR COMPOSITION BASED ON BARIUM TITANATE

[75] Inventors: Terunobu Ishikawa; Hideaki Niimi; Yasunobu Yoneda, all of Nagaokakyo, Japan

[73] Assignee: Murata Manufacturing Co., Ltd., Kyoto, Japan

[21] Appl. No.: 95,900

[22] Filed: Jul. 21, 1993

[30] Foreign Application Priority Data

Jul. 24, 1992 [JP] Japan .................... 4-218181

[51] Int. Cl.$^6$ ............................ H01C 7/10
[52] U.S. Cl. ................ 338/22 SD; 252/520; 501/137
[58] Field of Search ............. 338/22 R, 22 SD; 252/518, 520, 521; 501/136, 137, 138

[56] References Cited

U.S. PATENT DOCUMENTS 5,219,811  6/1993  Enomoto et al. ............... 501/138

FOREIGN PATENT DOCUMENTS 51-4276  2/1976  Japan .

Primary Examiner—Marvin M. Lateef
Attorney, Agent, or Firm—Ostrolenk, Faber, Gerb & Soffen

[57] ABSTRACT

A NTC thermistor composition based on barium titanate has a Ba site and Ti site in a mole ratio (Ba site/Ti site) of 0.99 to 1.05, while 5 to 40 mole percent of the Ba site is substituted by Ca and not more than 40 mole percent is substituted by Sr.

9 Claims, 2 Drawing Sheets

NTC THERMISTOR COMPOSITION BASED ON BARIUM TITANATE

BACKGROUND OF THE INVENTION

1. Field of the Invention

The present invention relates to a NTC thermistor composition based on barium titanate, which is applied to an inrush current preventing element for a switching regulator or the like.

2. Description of the Background Art

In order to prevent an inrush current upon power supply to a switching regulator or the like, employed is a negative temperature coefficient thermistor whose composition comprises spinel-type transition metal oxide whose resistance is reduced with an increase in temperature. This thermistor suppress the inrush current supplied to the switching regulator or the like due to a high resistance under the room temperature, while its electric power consumption is reduced in a stationary state since the resistance is thereafter reduced by temperature rising caused by self-heating. Thus, such a negative temperature coefficient thermistor is widely employed as an inrush current preventing element.

However, a conventional negative temperature coefficient thermistor which is applied to a switching regulator or the like has a B constant, expressing the relationship between temperature and resistance by the equation $R(T) = R_0 \exp(B/T)$ at 2000 to 4000K. Therefore, the resistivity of conventional negative temperature coefficient thermistor is so readily influenced by a change of temperature that its initial resistance is extremely varied with changes in atmospheric temperature to cause a variation in the rise characteristic. In particular, at a low temperature of less than 0° C., an inrush current preventing element with this thermistor takes much time to achieve a stationary state due to self-heating caused by high resistance.

In order to solve the aforementioned problem, required is a negative temperature coefficient thermistor whose B constant is small around ordinary temperatures ($-50°$ to $50°$ C.) and increases at higher temperatures beyond the said range.

In relation to such a negative temperature coefficient thermistor, there has been proposed an element which is prepared by adding 20 percent by weight of $Li_2CO_3$ to barium titanate ($BaTiO_3$), as disclosed in Japanese Patent Publication No. 48-6352 (1973).

In this element, however, power consumption is disadvantageously increased in a stationary state due to high specific resistance of at least $10^{-5}$ Ω·cm at a temperature of 140° C., although its B constant is abruptly increased when the temperature exceeds the phase transition point.

SUMMARY OF THE INVENTION

An object of the present invention is to provide NTC thermistor composition based on barium titanate which can suppress power loss in a stationary state with small resistance and has such negative temperature coefficient that its B constant is small at a room temperature and increased under a high temperature.

In this thermistor based on barium titanate according to the present invention, a Ba site and a Ti site are in a mole ratio (Ba site/Ti site), m, of 0.99 to 1.05, while 5 to 40 mole percent of the Ba site is substituted by Ca and not more than 40 mole percent thereof is substituted by Sr.

According to the present invention, the mole ratio m (Ba site/Ti site) of the Ba site to the Ti site is within the range of 0.99 to 1.05. When the mole ratio m is less than 0.99, the semiconductive ceramic exhibits such an NTC characteristic that its B constant is reduced at a temperature exceeding a tetragonal-to-cubic phase transition temperature, i.e., the Curie point. When the mole ratio m exceeds 1.05, on the other hand, resistance is so abruptly increased that the semiconductive ceramics is converted to an insulator.

According to the present invention, 5 to 40 mole percent of the Ba site is substituted by Ca. When the amount X of substitution by Ca is less than 5 mole percent, the ratio of a B constant at a temperature below the Curie point to that at a temperature exceeding the Curie point is so reduced that the semiconductive ceramic exhibits no such NTC characteristic that the B constant is small at room temperature and increased at high temperature.

According to the present invention, further, not more than 40 mole percent of the Ba site is substituted by Sr. If the amount Y of substitution by Sr is in excess of 40 mole percent, the phase transition temperature, i.e., the Curie point, is reduced below $-20°$ C. and the semiconductive ceramic exhibits characteristics similar to those of a conventional negative temperature coefficient thermistor.

The inventive thermistor having the aforementioned composition is excellent in temperature stability at low temperature and exhibits low resistance in a stationary state since it has such negative temperature coefficient that the B constant at a temperature exceeding a cubic-to-tetragonal phase transition point is considerably larger than that at a temperature below the phase transition point.

In the thermistor composition according to the present invention, it is possible to reduce power consumption in the stationary state due to small resistivity. Further, its B constant is so extremely changed at the phase transition point to exhibit such negative temperature coefficient characteristics that the B constant is small on the lower temperature side and increased on the higher temperature side. Thus, the inventive thermistor composition is useful in the field of an inrush current preventing element or the like. Further, it is possible to adjust the phase transition point to attain optimum performance in response to working conditions for an apparatus to which the inventive thermistor composition is applied, thereby adjusting the temperature allowing a change of the B constant.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
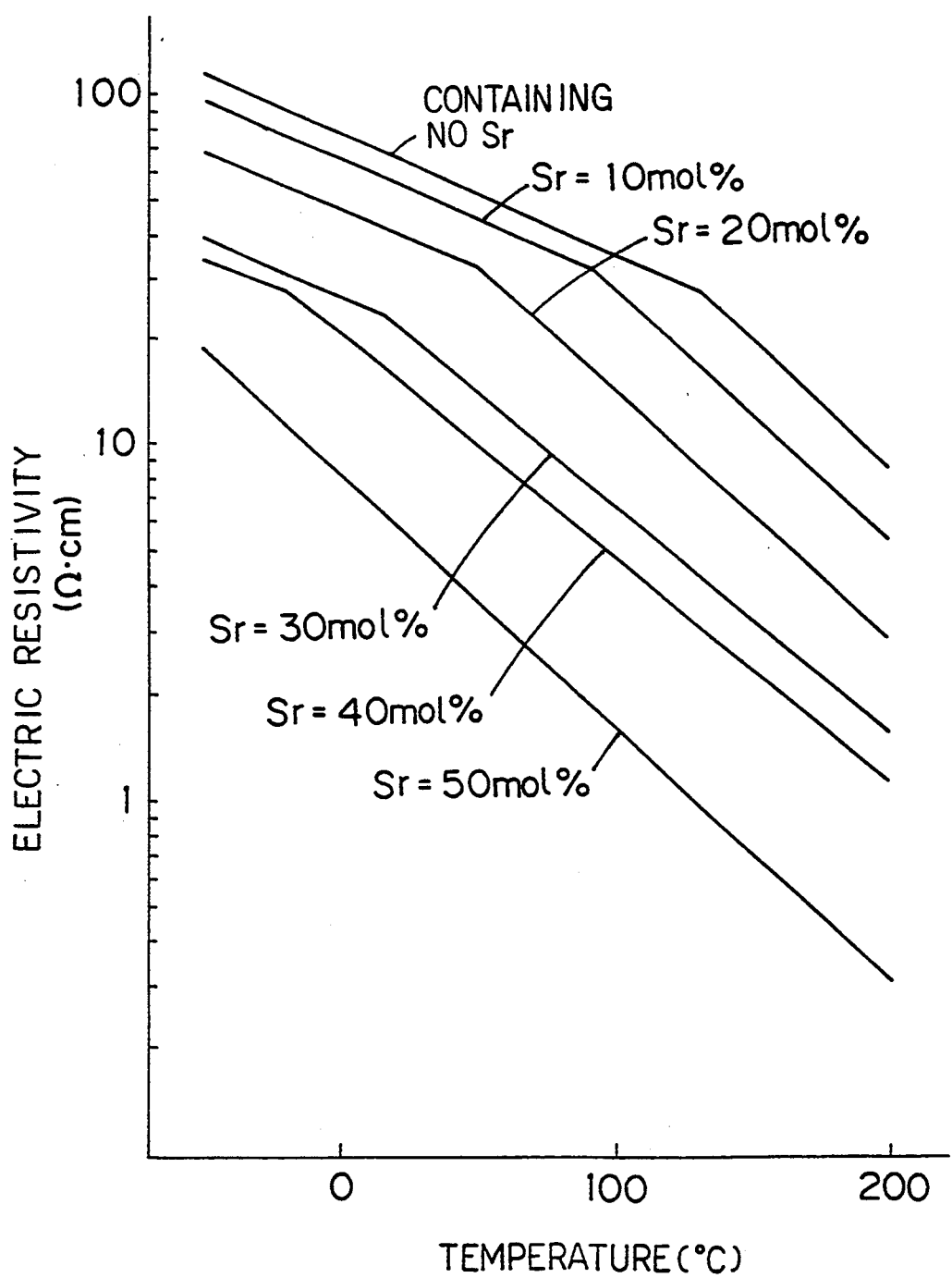
FIG. 1 illustrates resistivity/temperature characteristics of thermistor composition based on barium titanate according to Example of the present invention.
Figure 2:
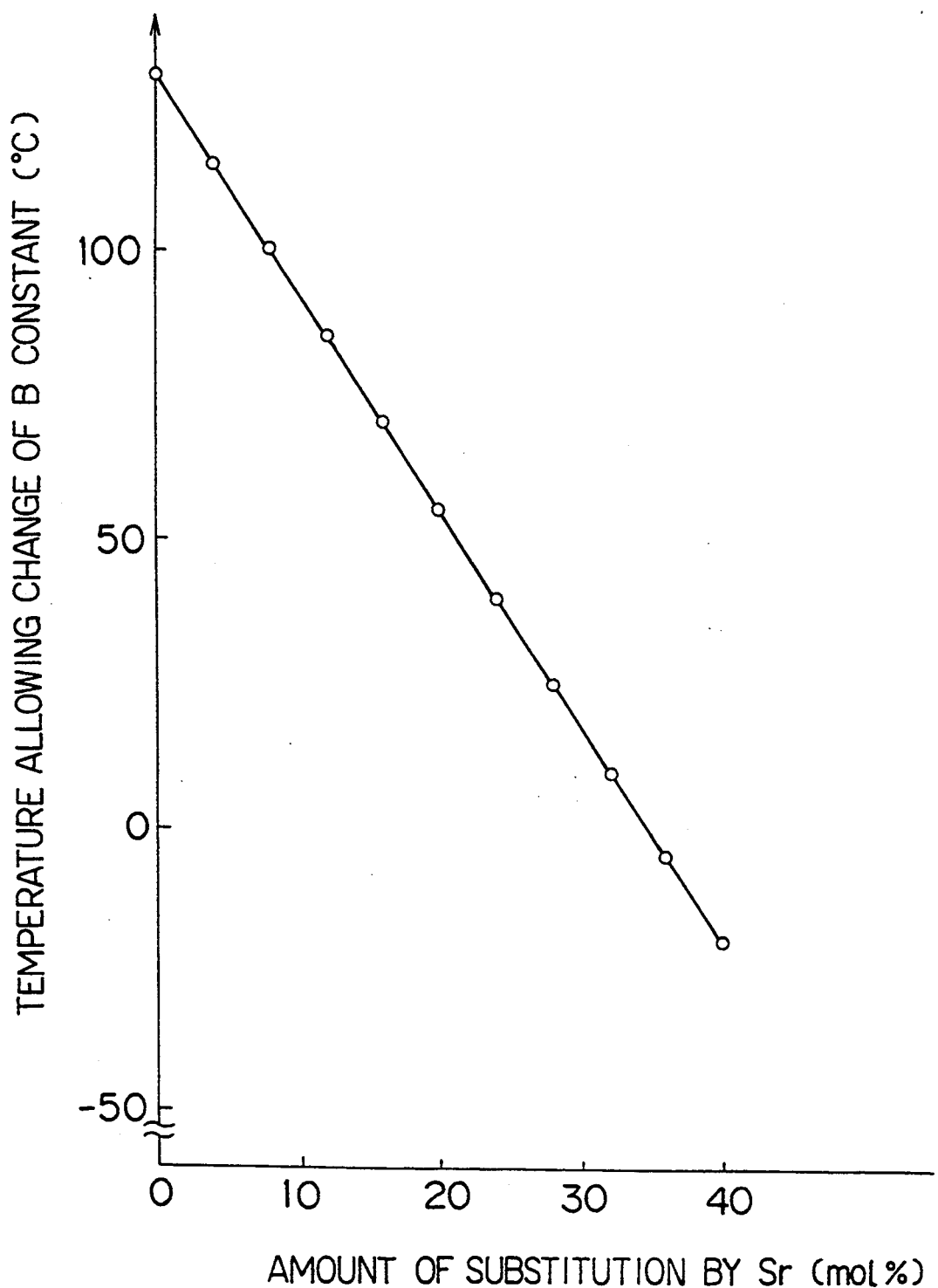
FIG. 2 illustrates relations between temperatures allowing changes of B constants of thermistor composition based on barium titanate according to example of the present invention and amounts of substitution by St.

Raw powder materials of $BaCO_3$, $CaCO_3$, $SrCO_3$, $La_2O_3$, $TiO_2$ and $SiO_2$ were weighed to attain the following composition:

$(Ba_{0.998-X-Y}Ca_XSr_YLa_{0.002})_mTiO_3 + 0.01SiO_2$

Then, the raw powder materials were wet-blended with water in a ball mill for five hours, dried and thereafter calcined at 1150° C. for two hours. Then, a binder was added to the as-obtained powder (calcined powder), wet-blended in a ball mill for five hours, pulverized, filtered, dried and thereafter pressure-molded into discs of 10 mm in diameter, which in turn were heated and sintered in an atmosphere ($H_2/N_2=3$ vol. %) prepared by mixing 3 percent of hydrogen to nitrogen at 1350° C. for two hours.

In-Ga was applied to both sides of the as-sintered ceramic discs to form electrodes, thereby preparing ceramic samples which were subjected to measurement of resistivity/temperature characteristics.

In these samples, the mole ratios m, the amounts X of substitution by Ca and the amounts Y of substitution by Sr were varied as shown in Tables 1, 2, 3 and 4. As to the resistivity/temperature characteristics, resistivity values at 25° C., B constants at −40° C. and 150° C., and the ratios of the B constants at −40° C. to those at 150° C. were measured as shown in Tables 1, 2, 3 and 4.

TABLE 1

| Sample No. | X (mol %) | Y (mol %) | m (—) | T (°C.) | ρ 25° C. (Ω·cm) | B −40° C. (K) | B 150° C. (K) | B 150° C. / B −40° C. (—) |
|---|---|---|---|---|---|---|---|---|
| *1 | 10 | 0 | 0.98 | 130 | 4.2 | 510 | 700 | 1.4 |
| *2 | 10 | 10 | 0.98 | 92 | 4.5 | 560 | 800 | 1.4 |
| *3 | 10 | 20 | 0.98 | 55 | 4.9 | 510 | 900 | 1.8 |
| *4 | 10 | 30 | 0.98 | 18 | 4.1 | 500 | 500 | 1.0 |
| *5 | 10 | 40 | 0.98 | −20 | 2.5 | 490 | 490 | 1.0 |
| *6 | 10 | 50 | 0.98 | −52 | 1.2 | 1590 | 1580 | 1.0 |
| *7 | 40 | 0 | 0.98 | 130 | 5.0 | 700 | 610 | 0.9 |
| *8 | 40 | 10 | 0.98 | 92 | 5.2 | 700 | 590 | 0.8 |
| *9 | 40 | 20 | 0.98 | 55 | 5.1 | 700 | 600 | 0.9 |
| *10 | 40 | 30 | 0.98 | 18 | 5.0 | 610 | 500 | 0.8 |
| *11 | 40 | 40 | 0.98 | −20 | 3.3 | 620 | 490 | 0.8 |
| *12 | 40 | 50 | 0.98 | −52 | 2.1 | 500 | 490 | 1.0 |
| *13 | 0 | 0 | 0.99 | 130 | 3.0 | 300 | 500 | 1.7 |
| *14 | 0 | 10 | 0.99 | 92 | 3.0 | 300 | 500 | 1.7 |
| *15 | 0 | 20 | 0.99 | 55 | 3.1 | 310 | 510 | 1.6 |
| *16 | 0 | 30 | 0.99 | 18 | 2.9 | 300 | 470 | 1.6 |
| *17 | 0 | 40 | 0.99 | −20 | 2.2 | 254 | 460 | 1.8 |
| *18 | 0 | 50 | 0.99 | −52 | 1.0 | 450 | 550 | 1.2 |
| 19 | 10 | 0 | 0.99 | 130 | 4.2 | 510 | 1800 | 3.5 |
| 20 | 10 | 10 | 0.99 | 92 | 4.5 | 350 | 1900 | 5.4 |

X: Amount of Substitution by Ca
Y: Amount of Substitution by Sr
m: Ba Site/Ti Site (mole ratio)
T: Temperature Allowing Change of B Constant

TABLE 2

| Sample No. | X (mol %) | Y (mol %) | m (—) | T (°C.) | ρ 25° C. (Ω·cm) | B −40° C. (K) | B 150° C. (K) | B 150° C. / B −40° C. (—) |
|---|---|---|---|---|---|---|---|---|
| 21 | 10 | 20 | 0.99 | 55 | 4.9 | 420 | 1900 | 4.5 |
| 22 | 10 | 30 | 0.99 | 18 | 4.1 | 500 | 1800 | 3.6 |
| 23 | 10 | 40 | 0.99 | −20 | 2.5 | 490 | 1800 | 3.7 |
| 24 | 10 | 50 | 0.99 | −52 | 1.2 | 1800 | 1780 | 1.0 |
| 25 | 40 | 0 | 0.99 | 130 | 5.0 | 600 | 2100 | 3.5 |
| 26 | 40 | 10 | 0.99 | 92 | 5.2 | 600 | 2000 | 3.3 |
| 27 | 40 | 20 | 0.99 | 55 | 5.1 | 600 | 2100 | 3.5 |
| 28 | 40 | 30 | 0.99 | 18 | 5.0 | 610 | 2000 | 3.3 |
| 29 | 40 | 40 | 0.99 | −20 | 3.3 | 620 | 1900 | 3.1 |
| 30 | 40 | 50 | 0.99 | −52 | 2.1 | 1800 | 1700 | 0.9 |
| *31 | 50 | 0 | 0.99 | 130 | 5.0 | 1000 | 700 | 0.7 |
| *32 | 50 | 10 | 0.99 | 92 | 5.2 | 1000 | 800 | 0.8 |
| *33 | 50 | 20 | 0.99 | 55 | 5.1 | 1000 | 900 | 0.9 |
| *34 | 50 | 30 | 0.99 | 18 | 5.0 | 900 | 600 | 0.7 |
| *35 | 50 | 40 | 0.99 | −20 | 3.3 | 890 | 490 | 0.6 |
| *36 | 50 | 50 | 0.99 | −52 | 2.1 | 890 | 790 | 0.9 |
| 37 | 10 | 0 | 1.010 | 130 | 30 | 330 | 2900 | 8.8 |
| 38 | 10 | 10 | 1.010 | 92 | 21 | 240 | 1900 | 7.9 |
| 39 | 10 | 20 | 1.010 | 55 | 26 | 310 | 2000 | 6.5 |
| 40 | 10 | 30 | 1.010 | 18 | 20 | 300 | 2100 | 7.0 |

X: Amount of Substitution by Ca
Y: Amount of Substitution by Sr
m: Ba Site/Ti Site (mole ratio)
T: Temperature Allowing Change of B Constant

TABLE 3

| Sample No. | X (mol %) | Y (mol %) | m (—) | T (°C.) | ρ 25° C. (Ω·cm) | B −40° C. (K) | B 150° C. (K) | B 150° C. / B −40° C. (—) |
|---|---|---|---|---|---|---|---|---|
| 41 | 10 | 40 | 1.010 | −20 | 12 | 340 | 2400 | 7.1 |
| *42 | 10 | 50 | 1.010 | −52 | 6.0 | 2000 | 2300 | 1.2 |
| *43 | 0 | 0 | 1.050 | 130 | 40 | 300 | −5000 | −16.7 |
| *44 | 0 | 10 | 1.050 | 92 | 40 | 300 | −5000 | −16.7 |
| *45 | 0 | 20 | 1.050 | 55 | 40 | 310 | −6000 | −19.4 |
| *46 | 0 | 30 | 1.050 | 18 | 40 | 300 | −7000 | −23.3 |
| *47 | 0 | 40 | 1.050 | −20 | 25 | 254 | −6100 | −24.0 |
| *48 | 0 | 50 | 1.050 | −52 | 10 | −7000 | −2000 | 0.3 |
| 49 | 10 | 0 | 1.050 | 130 | 99 | 510 | 1500 | 2.9 |
| 50 | 10 | 10 | 1.050 | 92 | 101 | 560 | 1500 | 2.7 |
| 51 | 10 | 20 | 1.050 | 55 | 102 | 510 | 1500 | 2.9 |
| 52 | 10 | 30 | 1.050 | 18 | 101 | 500 | 1400 | 2.8 |
| 53 | 10 | 40 | 1.050 | −20 | 85 | 490 | 1400 | 2.9 |
| *54 | 10 | 50 | 1.050 | −52 | 50 | 1500 | 1400 | 0.9 |
| 55 | 40 | 0 | 1.050 | 130 | 89 | 600 | 1400 | 2.3 |
| 56 | 40 | 10 | 1.050 | 92 | 88 | 600 | 1400 | 2.3 |
| 57 | 40 | 20 | 1.050 | 55 | 95 | 590 | 1400 | 2.4 |
| 58 | 40 | 30 | 1.050 | 18 | 75 | 610 | 1400 | 2.3 |
| 59 | 40 | 40 | 1.050 | −20 | 60 | 620 | 1400 | 2.3 |
| *60 | 40 | 50 | 1.050 | −52 | 40 | 1500 | 1300 | 0.9 |

X: Amount of Substitution by Ca
Y: Amount of Substitution by Sr
m: Ba Site/Ti Site (mole ratio)
T: Temperature Allowing Change of B Constant

TABLE 4

| Sample No. | X (mol %) | Y (mol %) | m (—) | T (°C.) | ρ 25° C. (Ω·cm) | B −40° C. (K) | B 150° C. (K) | B 150° C. / B −40° C. (—) |
|---|---|---|---|---|---|---|---|---|
| *61 | 50 | 0 | 1.050 | 130 | 100 | 700 | 600 | 0.9 |
| *62 | 50 | 10 | 1.050 | 92 | 110 | 700 | 600 | 0.9 |
| *63 | 50 | 20 | 1.050 | 55 | 110 | 700 | 600 | 0.9 |
| *64 | 50 | 30 | 1.050 | 18 | 100 | 500 | 400 | 0.8 |
| *65 | 50 | 40 | 1.050 | −20 | 85 | 490 | 390 | 0.8 |
| *66 | 50 | 50 | 1.050 | −52 | 74 | 500 | 390 | 0.8 |
| *67 | 10 | 0 | 1.060 | 130 | >$10^8$ | — | — | — |
| *68 | 10 | 10 | 1.060 | 92 | >$10^8$ | — | — | — |
| *69 | 10 | 20 | 1.060 | 55 | >$10^8$ | — | — | — |
| *70 | 10 | 30 | 1.060 | 18 | >$10^8$ | — | — | — |
| *71 | 10 | 40 | 1.060 | −20 | >$10^8$ | — | — | — |
| *72 | 10 | 50 | 1.060 | −52 | >$10^8$ | — | — | — |
| *73 | 40 | 0 | 1.060 | 130 | >$10^8$ | — | — | — |
| *74 | 40 | 10 | 1.060 | 92 | >$10^8$ | — | — | — |
| *75 | 40 | 20 | 1.060 | 55 | >$10^8$ | — | — | — |
| *76 | 40 | 30 | 1.060 | 18 | >$10^8$ | — | — | — |
| *77 | 40 | 40 | 1.060 | −20 | >$10^8$ | — | — | — |
| *78 | 40 | 50 | 1.060 | −52 | >$10^8$ | — | — | — |

X: Amount of Substitution by Ca
Y: Amount of Substitution by Sr
m: Ba Site/Ti Site (mole ratio)
T: Temperature Allowing Change of B Constant Referring to Tables 1 to 4, asterisked (*) numbers indicate comparative samples which were out of the ranges of the present invention, while other numbers indicate inventive samples.

FIG. 1 shows relations between resistivity values and temperatures (resistivity/temperature characteristics) in the samples Nos. 37 to 42 shown in Tables 2 and 3. In the samples shown in FIG. 1, the amounts Y of substitution by Sr were changed from 0.000 (0 mol %), 0.100 (10 mol %), 0.200 (20 mol %), 0.300 (30 mol %), 0.40 (40 mol %) and 0.500 (50 mol %) under conditions of an amount X of substitution by Ca of 0.100 (10 mol %) and mole ratio m (Ba sites/Ti sites) of 1.01.

It is clearly understood from Tables 1 to 4 and FIG. 1 that the tetragonal-to-cubic phase transition temperature, i.e., the temperature allowing a change of the B constant, was reduced by 3° to 4° C. (about 3.7° C. on the average) per mole of substitution by Sr in each sample. In other words, it is understood the temperature allowing a change of the B constant was changed from about 130° C. (amount Y of substitution by Sr=50 mol %) to −20° C. (amount Y of substitution by Sr=40 mol %) and −52° C. (amount Y of substitution by Sr=50 mol %).

It is also understood from Tables 1 to 4 that the B constants were in the vicinity of about 500K under temperatures below the cubic-to-tetragonal phase transition points, i.e., Curie temperatures, regardless of the amounts of substitution by Sr, while the B constants were in the vicinity or in excess of about 2000K under temperatures exceeding the phase transition points in the samples within the ranges of the present invention.

It is further understood from Tables 1 to 4 that the mole ratio m, the amount Y of substitution by Ca and the amount Y of substitution by Sr are in the following relations:

(1) When the mole ratio m is less than 0.99, the thermistor of the barium titanate ceramic exhibits such an NTC characteristic that the B constant is reduced under temperatures exceeding the Curie point, as clearly understood from the samples Nos. 1 to 12. When the amount X of substitution by Ca exceeds 50 mole percent, the barium titanate ceramic also exhibits such an NTC characteristic that the B constant is reduced under temperatures exceeding the Curie point, as clearly understood from the samples Nos. 31 to 36.

(2) When no Ca is added, the ratio B(150° C.)/B(−40° C.) is reduced below 2, as clearly understood from the samples Nos. 13 to 18.

(3) When the mole ratio m exceeds 1.05, the resistance is so abruptly increased that the barium titanate semiconductive ceramic is converted to an insulator, as clearly understood from the samples Nos. 67 to 78.

(4) The barium titanate semiconductive ceramic exhibits PTC characteristics if no Ca is added when the mole ratio m is 1.05, even if the material is sintered under a reducing atmosphere, as clearly understood from the samples Nos. 43 to 48.

(5) When Sr is added in an amount exceeding 40 mole percent, the phase transition temperature is reduced below −20° C. and the barium titanate ceramic gains no advantage over a conventional negative temperature coefficient thermistor in practice, as clearly understood from the samples Nos. 8, 12, 24, 30, 36, 42, 48, 54 and 60.

As clearly understood from the above description, it is possible to apply the barium titanate semiconductive ceramic having the composition of the mole ratio m, the amount X of substitution by Ca and the amount Y of substitution Sr within the inventive ranges to an NTC material having NTC characteristics for a switching regulator, for example, since the same has the ratio B(150° C.)/B(−40° C.) of at least 2 with small resistivity.

While the above Example has been described with reference to barium titanate ceramics doped with La at the Ba site, it is possible to attain an effect similar to that of Example also when the inventive barium titanate ceramics having negative temperature coefficient is not doped with La. Further, it is also possible to allow coexistence of a rare earth element such as Y, which is a doner, or a small amount of another component other than La.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thermistor composition based on barium titanate, comprising a Ba site and a Ti site in a mole ratio (Ba site/Ti site) of 0.99 to 1.05, 5 to 40 mole percent of said Ba site being substituted by Ca, and not more than 40 mole percent of said Ba site being substituted by Sr, said thermistor composition having a negative temperature coefficient.

2. The thermistor composition in accordance with claim 1, being expressed in the following formula:

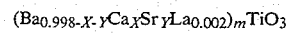

$(Ba_{0.998-X-Y}Ca_X Sr_Y La_{0.002})_m TiO_3$ where X represents a value of 0.05 to 0.40, Y represents a value of 0 to 0.40, and m represents a value of 0.99 to 1.05.

3. The thermistor composition in accordance with claim 1, wherein a tetragonal-to-cubic phase transition temperature is within a range of −20° C. to 130° C.

4. The thermistor composition in accordance with claim 1, wherein 10 to 40 mole percent of said Ba site is substituted by Ca.

5. The thermistor composition in accordance with claim 2, wherein X represents a value of 0.1 to 0.4.

6. A thermistor composition produced by the process of sintering in a reducing atmosphere a barium titanate forming composition containing sources of Ca and Sr such that the sintered composition has a Ba site and Ti site in a mole ratio of 0.99–1.05, contains 5 to 40 mole percent of said Ba site substituted by Ca and not more than 40 mole percent of Ba site substituted by Sr and exhibits a negative temperature coefficient.

7. The thermistor composition in accordance with claim 6, wherein the sintered composition contains 10 to 40 mole percent of said Ba site substituted by Ca.

8. The thermistor composition in accordance with claim 6, wherein the sintered composition is expressed by the formula:

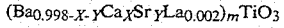

$(Ba_{0.998-X-Y}Ca_X Sr_Y La_{0.002})_m TiO_3$ where X represents a value of 0.05 to 0.40, Y represents a value of 0 to 0.40, and m represents a value of 0.99 to 1.05.

9. The thermistor composition in accordance with claim 8, wherein X represents a value of 0.1 to 0.4.

* * * * *